United States Patent
Krieg

[11] Patent Number: 5,937,889
[45] Date of Patent: Aug. 17, 1999

[54] INLET AIR FILTER FOR VACUUM BREAKER VALVES

[76] Inventor: Ingo Krieg, 4155 Lakeside Dr., Jacksonville, Fla. 32210

[21] Appl. No.: 09/003,512

[22] Filed: Jan. 6, 1998

[51] Int. Cl.[6] .............................. F16K 27/12; E03C 1/10
[52] U.S. Cl. ........................................... 137/218; 137/549
[58] Field of Search ................................... 137/217, 218, 137/526, 549

[56] References Cited

U.S. PATENT DOCUMENTS

| | | |
|---|---|---|
| 1,476,618 | 12/1923 | Jones . |
| 1,488,604 | 4/1924 | Lawton . |
| 2,033,955 | 3/1936 | Robinovitz . |
| 2,184,190 | 12/1939 | Krauss . |
| 2,211,011 | 8/1940 | Heinzelmann . |
| 2,405,241 | 8/1946 | Smith . |
| 3,811,467 | 5/1974 | Jones . |
| 3,863,671 | 2/1975 | Heimann . |
| 3,989,058 | 11/1976 | Jackson et al. . |
| 4,232,706 | 11/1980 | Ericson ................. 137/526 X |
| 4,489,746 | 12/1984 | Daghe et al. ............ 137/218 |
| 4,535,807 | 8/1985 | Ericson ................. 137/526 X |
| 4,556,084 | 12/1985 | Frawley ................. 137/526 |
| 4,991,623 | 2/1991 | Ericson ................. 137/217 X |
| 5,273,068 | 12/1993 | Duren ................... 137/526 |
| 5,623,958 | 4/1997 | Bumpers . |

OTHER PUBLICATIONS

Wilkins (Member A.S.P.E.), Atmospheric Vacuum Breakers; Vacuum Breaker Valves, Sales Catalog, pp. 28, 33 (undated).
"Backflow Prevention Products, for Plumbing, Irrigation, Fire Protection and Waterworks", Watts Regulator, Water Products Division Safety & Control Valves, Catalog listing of Agents, C–BPD 9516, listing of parts, p. 3 (undated).

*Primary Examiner*—Gerald A. Michalsky
*Attorney, Agent, or Firm*—Pillsbury Madison & Sutro, LLP

[57] ABSTRACT

A vacuum breaker valve includes a body defining a liquid inlet and a liquid outlet and a vent cap structure having vent openings defining an air passage into the breaker element. A float element is slidably disposed on a float post within the breaker to move between a system sealing position and a venting position. The vent cap structure includes a riser structure having a vent wall in which the vent openings are formed and an external cap element. An air permeable water resistant barrier, which substantially prevents foreign debris from entering the piping system through the air passage, is operatively coupled to the vent cap or the body within the air passage. The barrier may be disposed within the riser structure beneath the cap element, may span a gap between the cap element and the riser structure, or may replace the cap element and be attached to the breaker over the riser structure.

2 Claims, 3 Drawing Sheets

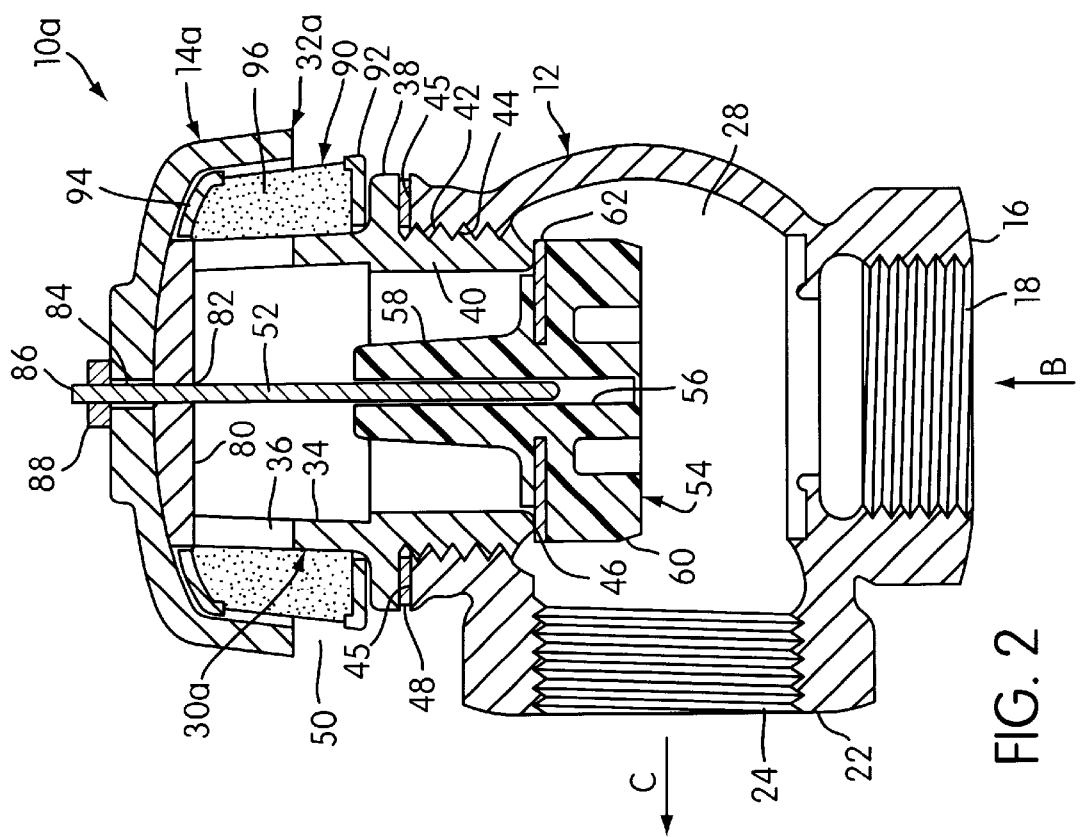
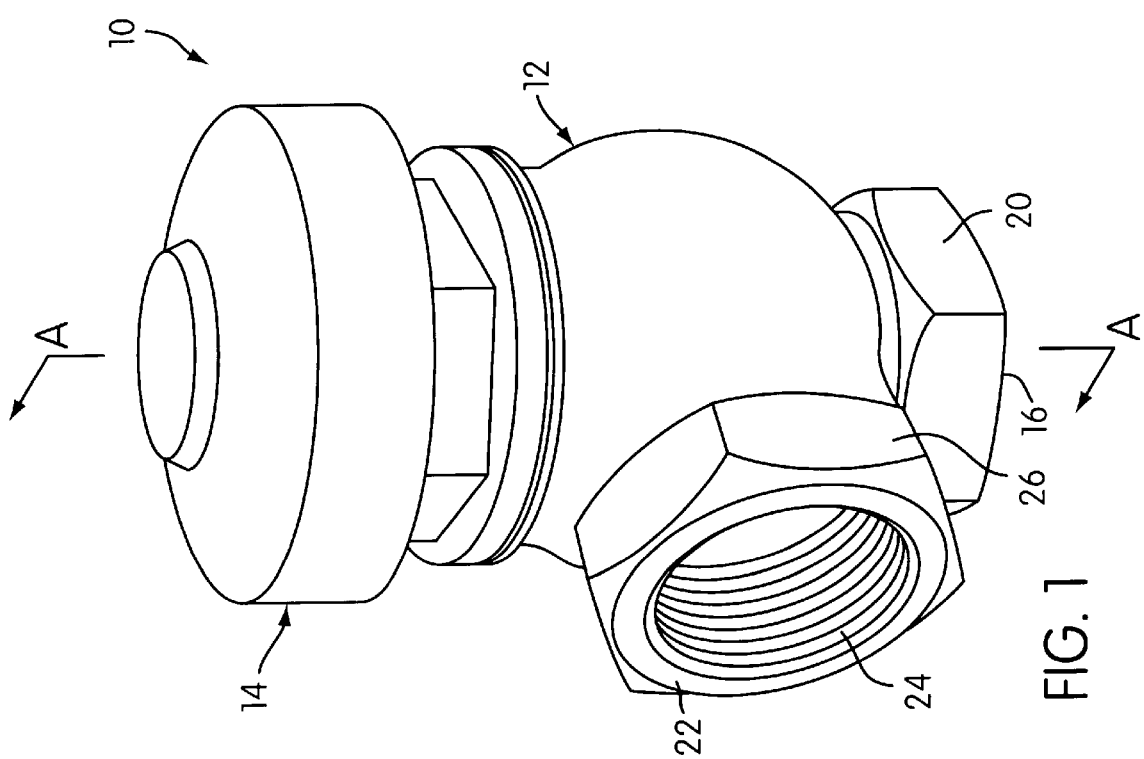

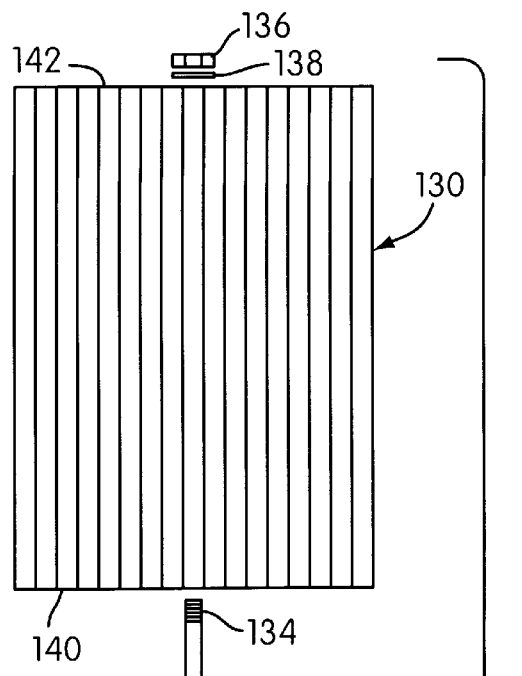
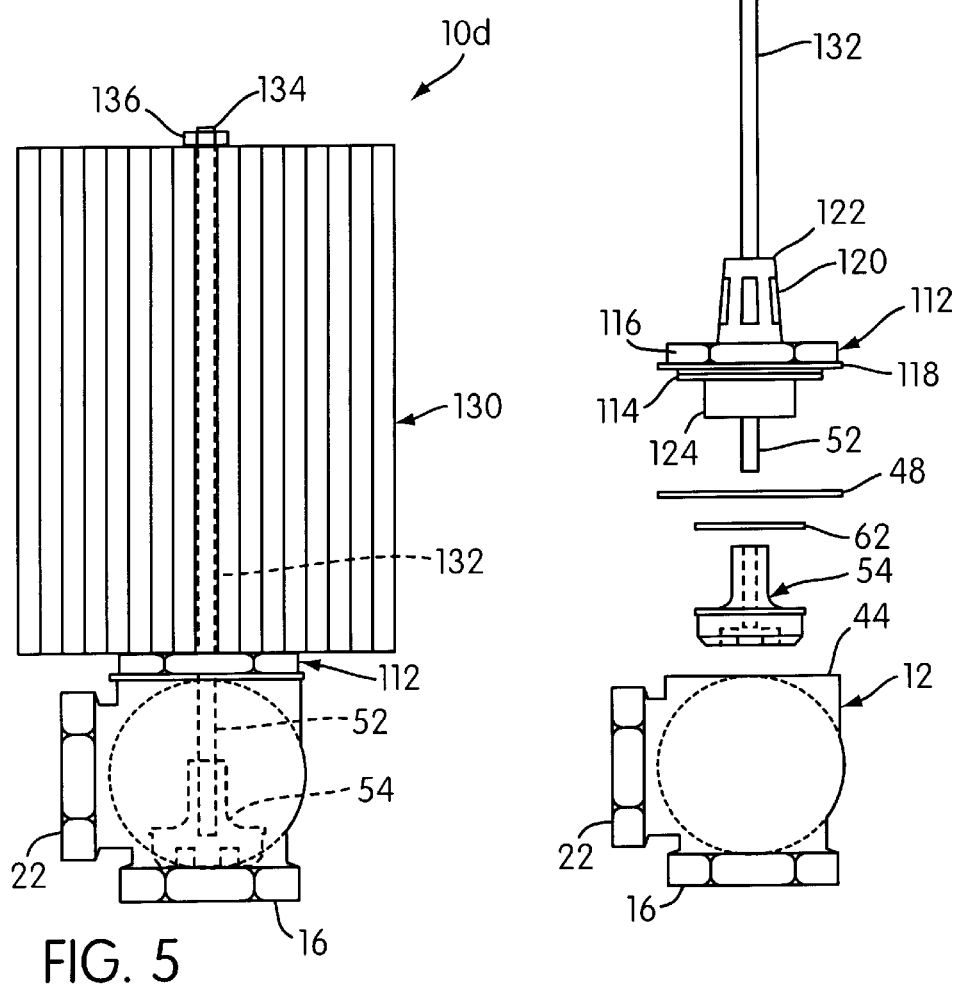
FIG. 5
FIG. 6

INLET AIR FILTER FOR VACUUM BREAKER VALVES

BACKGROUND OF THE INVENTION

1. Field of the Invention

The present invention relates to a filter, or screen, for preventing the ingesting of foreign debris into a vacuum breaker valve used in a liquid piping system.

2. Description of the Related Prior Art

A liquid piping system is under a positive pressure when liquid is flowing through the system from the liquid source to a user of the liquid. When the liquid flow is stopped and pressure within the system is suddenly reduced, a negative pressure can be created within the system which can cause a backflow condition known as back siphonage from the liquid user back to the liquid source. If the piping system happens to be a water pipe delivering water from a potable water source to a water user, and the user is in communication with non-potable water, a back siphonage condition can cause non-potable water to be introduced into the potable water supply.

A number of devices and systems have been developed for preventing back siphonage. One commonly used device is a vacuum breaker which prevents back siphonage by venting the piping system, thus preventing the creation of a vacuum within the system which can create a backflow condition. Typical vacuum breakers include atmospheric vacuum breakers and pressure vacuum breakers. Atmospheric vacuum breakers have a disc float assembly comprising a float, slidably movable on a post, which seals off an atmospheric vent area when the system is pressurized, and falls under its own weight when the system is no longer pressurized to open the atmospheric vent area and allow air to enter the piping system to interrupt a possible back siphonage action. Pressure vacuum breakers are also designed to prevent back siphonage using a check valve designed to close with the aid of a spring when the water flow stops. The air inlet valve of the breaker opens when the internal pressure of the piping system drops, thus preventing possible back siphonage.

SUMMARY OF THE INVENTION

While vacuum breakers such as those described above are effective for preventing back siphonage conditions, and thus preventing the contamination of a liquid source supply due to backflow, the inventor has discovered that such devices inherently open the piping system to the atmosphere, which itself can be a source of contamination for the piping system. For example, the vent openings provided in typical vacuum breakers are large enough to allow for the ingestion of foreign debris such as dirt, plant matter, and/or insects into the breaker and thus into the piping system.

Therefore, to fully protect the liquid piping system, it is desirable to provide an air permeable barrier, such as a filter or screen, for preventing the ingestion of such foreign debris into the piping system through a vacuum breaker device. More specifically, the need exists for an air permeable barrier or air inlet filter which can be easily retrofitted onto existing conventional vacuum breakers typically used in water piping systems.

The present invention provides a filter assembly which can be easily retrofitted on existing conventional atmospheric vacuum breaker valves so that debris such as dirt, plant matter, and insects can be kept out of the piping system.

Accordingly, the present invention provides a filtered vacuum breaker which comprises a body defining an interior cavity and having a liquid inlet and a liquid outlet and a vent cap removably attachable to the body, the vent cap having a vent opening formed therein which defines an air passage between the interior cavity of the body and the atmosphere. The breaker further includes a float post extending from the vent cap into the interior cavity. An air cutoff float element is slidably disposed on the float post and is operable to cut-off the air passage when the piping system is pressurized and to open the air passage when the piping system is subject to a negative pressure gradient. An air-permeable barrier element is operatively associated with the air passage to substantially prevent foreign debris from entering the piping system through the vent opening.

In specific preferred embodiments of the invention, the vent cap of the vacuum breaker comprises a riser structure extending away from the valve body, with the vent opening being formed in the riser structure, and an external cap element attached to the riser structure so as to protectively cover the vent opening without blocking the air passage. The external cap element has a width greater than the width of the riser structure and overhangs the riser structure so as to define a gap, which constitutes a portion of the air passage, between an outer periphery of the cap and the riser structure.

In one embodiment, the air-permeable barrier element comprises a screen attached at one portion thereof to the external cap element and at another portion thereof to the riser structure and which spans the gap to substantially prevent foreign debris from entering the piping system through the air passage.

In another embodiment, the air-permeable barrier element comprises a filter element disposed beneath the external cap element and within the gap to substantially prevent foreign debris from entering the piping system through the air passage.

In yet another embodiment, the external cap element has a cylindrical boss centrally disposed on an underside thereof from which the float post extends. The cylindrical boss has exterior threads formed thereon, and the air-permeable barrier element comprises a generally annular structure defining a central axial opening therethrough with one end of the central axial opening having interior threads formed thereat. The annular structure is disposed coaxially with the float post beneath the external cap element in a blocking relation with respect to the vent opening and is secured beneath the external cap element by threading the central axial opening of the barrier onto the exterior threads of the cylindrical boss.

In yet another embodiment, the float post extends through the vent cap with a second portion extending from the vent cap outside the interior cavity. The air-permeable barrier element comprises a hollow structure with outer air-permeable walls and a central opening defined therethrough and is operatively disposed on the vent cap with the second portion of the rod extending through the central opening. Retainer elements, such as a retainer plate and a threaded nut, are provided to secure the air-permeable barrier element to the second portion of the rod to thereby secure the air-permeable barrier element to the vent cap.

Other objects, features, and characteristics of the present invention will become apparent upon consideration of the following description and the appended claims with reference to the accompanying drawings, all of which form a part of the specification, and wherein like reference numerals designate corresponding parts in the various figures.

BRIEF DESCRIPTION OF THE DRAWINGS

FIG. 1 is a perspective view of an atmospheric vacuum breaker valve of the type commonly used in water piping systems;

FIG. 2 is a cross section of the atmospheric vacuum breaker valve of FIG. 1 taken in the direction "A—A" illustrating a first embodiment of an inlet air filter according to the present invention;

FIG. 5 is a side elevation of an atmospheric vacuum breaker valve fitted with an inlet air filter according to a fourth embodiment of a present invention; and FIG. 6 is an exploded view of the inlet air filter and atmospheric vacuum breaker valve of FIG. 5.

DETAILED DESCRIPTION OF THE INVENTION

Figure 4:
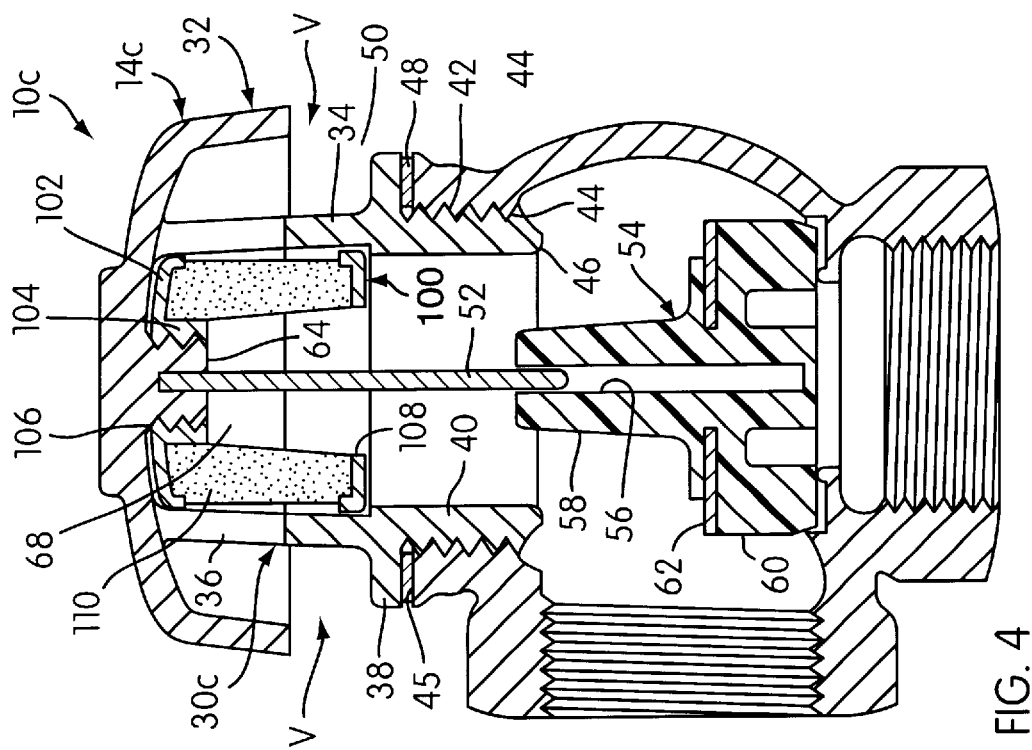
FIG. 4 is a cross section of the atmospheric vacuum breaker valve of FIG. 1 taken in the direction "A—A" illustrating a third embodiment of an inlet air filter for an atmospheric vacuum breaker valve.

An atmospheric breaker valve, designated generally by reference number 10, is shown in FIG. 1. Valve 10 includes a valve body 12, typically made of brass and typically installed in series within a liquid piping system with pipe coming from the liquid source entering into an inlet 20 and exiting an outlet 22 into a pipe directed toward the liquid user. The valve 10 also includes a vent cap 14 removably attached to the body 12 and also typically made of brass.

As shown, for example in the cross-sectional view of FIG. 2, the valve body 12 defines therein an interior cavity 28. Inlet 16 communicates with the interior cavity 28 through a circular opening preferably having a plurality of interior threads 18 formed thereon. Inlet 16 preferably also has a hexagonal outer structure 20 to permit the valve to be engaged by a wrench during installation thereof.

Outlet 22 communicates with interior cavity 28 through a circular opening preferably having a plurality of interior threads 24 formed thereon. Like the inlet 16, outlet 22 preferably has hexagonal outer structure 26 formed thereon to permit the valve to be engaged by a wrench during installation thereof.

Figure 3:
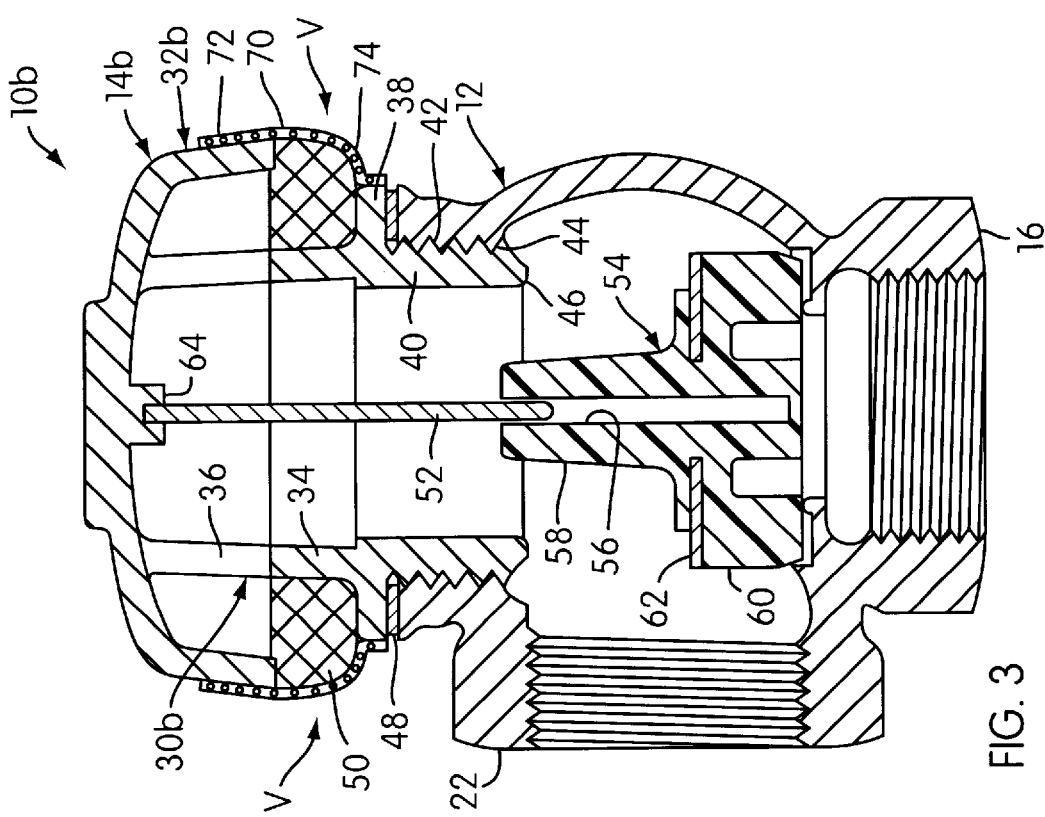
FIG. 3 is a cross section of the atmospheric vacuum breaker valve of FIG. 1 taken in the direction "A—A" illustrating a second embodiment of an inlet air filter for an atmospheric vacuum breaker valve.

The three embodiments of the present invention shown in FIGS. 2–4 include vent cap structures 14a, 14b, and 14c, respectively, each having a riser structure 30a, 30b, and 30c, respectively. Each riser structure includes an attachment extension 40 having a plurality of exterior threads 42 formed thereon. Attachment extension 40 is received within an interiorly threaded opening 44 formed in the body 12 of the valve. The end of the attachment extension 40 defines an annular end face 46, which may have a rounded cross-sectional shape as shown in the figures. Disposed axially above the attachment extension 40 is a peripherally annular rim flange 38 extending radially outwardly from the attachment extension 40. A gasket 48 is preferably installed between vent cap 14 and body 12 and is sandwiched between rim flange 38 and annular face 45 extending around opening 44.

Extending above the annular rim flange 38 is a continuous vent wall 34 having a plurality of air vent openings 36 formed therein. Centrally disposed within the riser structure 30a, 30b or 30c, is a float post 52 and disposed above the vent wall 34 is an external cap element designated by reference numbers 32a, 32b, 32c, in FIGS. 2, 3, and 4, respectively.

Each of the cap elements 32a, 32b, 32c has a width greater than the width of the respective riser structures 30a, 30b, 30c, respectively, and is disposed in overhanging relation with respect to the vent wall 34 of each of the riser structures so as to define a gap 50 between the cap element and the associated riser structure. Further details regarding the construction of the various embodiments of the cap elements will be described in more detail below.

A float element 54 is slidably disposed on the float post 52. Float element 54 is typically made of plastic and includes an upper portion 58, being preferably slightly conical in shape, and a lower, generally circular portion 60. A post accommodating central bore 56 is formed into the body of the float element 54. An elastomeric gasket 62 is provided between the upper portion 58 and lower portion 60 of the float element 54.

The operation of the atmospheric vacuum breaker valve, which is essentially conventional, will now be described. The breaker valve 10 is preferably installed into the liquid piping system substantially in the orientation shown in the figures. When the piping system is under pressure, liquid flows into the interior cavity 28 through the inlet 16 in the direction indicated by arrow "B" and exits the interior cavity 28 through the outlet 22 in the direction indicated by arrow "C". The pressure of the system forces the float element 54 to move up within the interior cavity 28 on the post 52 so that the gasket 62 disposed on the peripheral edge of the enlarged lower portion 60 of the float element 54 makes a liquid sealing contact with the annular end face 46 of the attachment extension 40 as shown in FIG. 2. Accordingly, with the piping system under pressure, liquid flows into and out of the cavity 28, preferably without any substantial leaking around the float element 54.

When the liquid flow is stopped, thus depressurizing the piping system, the float element 54, no longer held up by the pressure within the system, falls under the force of gravity to the lower position shown in FIGS. 3 and 4. With the float element 54 disposed in the lower position, the interior cavity 28 is open to the atmosphere through the vent wall 34 and the vent openings 36 so that air may flow into the cavity 28 as indicated by the arrows "V" to thus interrupt any vacuum formed by the depressurization of the piping system.

The present inventor has discovered, however, that foreign debris such as dirt, plant material, and/or insects can easily enter the piping system through the vent openings 36. Accordingly, the present invention provides an air permeable barrier which prevents such foreign debris from entering the piping system through the vent openings 36 of the vacuum breaker valve while still allowing air to enter the vent openings 36.

A first embodiment of the invention is shown in FIG. 2. Vacuum breaker valve 10a has a vent cap 14a which comprises a vent cap riser structure 30a having a external cap element 32a removably attached thereto. The vent cap riser structure 30a includes the vent wall 34 having a plurality of vent openings 36 formed therein and a top structure 80 extending across the vent wall 34. Float post 52 extends into the internal cavity 28 through an aperture 82 formed in the top structure 80. Float post 52 is preferably fixably secured to the top structure 80 by a suitable adhesive material, such as an industrial grade epoxy, or by brazing the float post 52 to the top structure 80.

External cap element 32a is removably secured onto the top of the vent cap riser structure 30a. An upper portion 86 of the float post 52 extends above the top structure 80 of the vent cap structure 30a. The external cap element 32a is removably secured to the vent cap riser structure by placing the cap element over the top structure 80 of the vent cap riser structure 30a with the upper portion 86 of the float post 52 extending through an aperture 84 formed centrally within the cap element 32a. Cap element 32a is preferably held in place on the vent cap riser structure 30a by means of a nut 88 turned onto the upper portion 86, which is preferably threaded so as to receive the nut 88.

A filter element 90 having a generally annular structure is configured to fit around the outside of the vent wall 34 of the vent cap riser structure 30a. Filter element 90 preferably includes a lower annular cap structure 92 and an upper annular cap structure 94, preferably shaped so as to conform to the underside of the cap element 32a, with an air permeable and water resistant filter material 96 sandwiched therebetween. Material 96 may be any conventional foam or fibrous filter material that is air permeable and water resistant. An air permeable out skin material may be provided to protect the filter material. The filter element 90 can be installed about the riser structure 30a before the cap element 32a is removably attached to the riser structure. In many breaker valve arrangements, the vent wall 34 has a hexagonal shape. The inner wall of filter element 90 is preferably shaped to conform to vent wall 34, whether it be hexagonal, round, or some other shape. Thus, filter element 90 is preferably sized and configured so as to fill the outer annular space between the cap element 32 and the riser structure 30a and so as to extend between rim flange 38 and the underside of cap element 32a. Thus, filter element 90 presents an air permeable barrier which prevents foreign debris from entering into the vent openings 36 through gap 50.

A second embodiment of the present invention is shown in FIG. 3. In the second embodiment, cap element 32b and vent cap riser structure 30b of vacuum breaker valve 106 are integrally formed together. An air permeable barrier is presented by a screen element 70 spanning the gap 50 between the cap element 32b and the riser structure 30b. Screen 70 is attached at an upper portion thereof 72 about the perimeter of the cap element 32b and at a lower portion 74 thereof to the riser structure 30B, such as at an outer edge of the annular rim flange 38. Screen element 70 is preferably a fine metal mesh screen which is air permeable yet prevents foreign debris such as dirt or insects, from entering the gap 50 and potentially entering the air vents 36.

A third embodiment of the present invention is shown in FIG. 4. The vacuum breaker valve 10c of the third embodiment includes a vent cap 14c in which the cap element 32c is formed integrally with the riser structure 30c. A filter element 100 is provided within the interior space defined inside the vent wall 34 so as to block the vent openings 36. Filter element 100 is of an annular construction and includes a lower cap 108 and an upper cap 102 with an air permeable and water resistant filter material 110 sandwiched therebetween. Filter material 110 is a foam or fibrous filter material that is air permeable and water resistant. Upper annular cap 102 of the filter element 100 includes a cylindrical boss section 104 having interior threads formed thereon which engage exterior threads 106 formed on the boss 64 of the external cap element 32c so as to removably secure the filter element 100 within the interior space defined by the vent wall 34. The outer wall of filter element 100 is preferably shaped to conform to the vent wall 34, whether it be round, hexagonal, or some other shape. An air permeable inner and/or outer skin material may be provided on the inner and outer sides of the filter elements 100 so as to protect the filter material 110.

A fourth embodiment of the present invention is shown in FIGS. 5–6. The vacuum breaker valve 10d of the fourth embodiment does not include a vent cap as shown in embodiments 1–3 shown in FIGS. 2–4. Vacuum breaker valve 10d includes a vent cap 112 having an exteriorly threaded portion 114 for attaching the vent cap 112 to the threaded opening 44 of the body 12.

Vent cap 112 includes an annular rim flange 118 and an external hexagonal structure 116 which can be engaged by a wrench when the vent cap structure 112 is installed. A float-engaging sealing extension 124 extends below flange 118 and a vent riser structure 122 extends above flange 118. A plurality of vent openings 120 is formed in the vent riser structure 122 to define an air passage between the interior cavity of body 12 and the atmosphere.

Float post 52 extends centrally below the vent cap 112 and is preferably fixably secured thereto by a suitable adhesive or by brazing. When a system in which breaker 10d is employed is pressurized, float 54 slides up post 52 with the upper portion of the float 54 being accommodated within vent riser structure 122 and the interior cavity being sealed by engagement of the lower portion of float 54 with sealing extension 124.

An extended rod portion 132 extends upwardly above the vent cap 112 and preferably has an exteriorly threaded end portion 134. Filter element 130 preferably comprises a hollow structure having external air permeable walls. Filter element 130 further preferably includes a cap structure (not shown) at its lower end 140 shaped so as to conform to the vent cap 112 and an upper cap (not shown) disposed at the upper end 142 of the filter element 130. An outer protective cover made of plastic or stainless steel may be provided over filter element 130 and is preferred for outdoor applications. Filter element 130 is installed by placing the element over the extended rod portion 132 until the lower end 140 thereof is operatively seated on the vent cap 112. The cap at the upper end 142 of the filter element 130 preferably includes a small aperture formed centrally therethrough for receiving the upper portion 134 of the extended rod 132, and the filter element is removably secured to the vacuum breaker valve by means of a nut 136 and washer 138 arrangement operatively tightened onto the threaded end 134 of the rod 132.

While the invention has been described in connection with what is presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the inlet air filter of the present invention can be made without departing from the novel aspects of this invention as defined in the following claims.

What is claimed is:

1. A filtered vacuum breaker for automatically venting a liquid piping system to the atmosphere when the system is subject to a negative pressure gradient to prevent back siphonage through the system while substantially preventing foreign debris from entering the piping system through the breaker, said breaker comprising:

a body defining an interior cavity and having a liquid inlet and a liquid outlet both in communication with said interior cavity;

a vent cap removably attachable to said body, said vent cap defining at least one vent opening therein providing a passage for air flow between atmosphere and said interior cavity, said vent cap comprising a riser structure extending away from said body with said at least one vent opening being formed in said riser structure and an external cap element attached to said riser structure so as to protectively cover said at least one vent opening without blocking the passage for air flow provided thereby;

a float post extending from said vent cap into said interior cavity;

an air cut-off float element slidably disposed on said float post and constructed and arranged to slide along said float post between an air cut-off position in which said air cut-off float element blocks said passage for air flow to prevent the piping system from being vented to atmosphere and a venting position in which said air cut-off element is moved away from said passage for air flow to vent the piping system to atmosphere and to assume the air cut-off position when the piping system is pressurized and to assume the venting position when the piping system is subject to a negative pressure gradient; and an air-permeable barrier operatively coupled to at least one of said body and said vent cap so as to intersect said air flow, said barrier substantially preventing foreign debris from entering the piping system through said at least one vent opening, wherein said external cap element has a cylindrical boss centrally disposed on an underside thereof with said float post extending coaxially from said cylindrical boss, said cylindrical boss having external threads formed thereon, and wherein said air-permeable barrier comprises a generally annular structure defining a central axial opening therethrough with one end of said central axial opening having internal threads formed thereat, said annular structure being disposed coaxially with said float post beneath said external cap element in intersecting relation with respect to said passage for air flow and being secured beneath said external cap element by threadingly engaging said internal threads of said central axial opening with said external threads of said cylindrical boss.

2. A filter assembly for substantially preventing foreign debris from entering a liquid piping system through a vacuum breaker for automatically venting the piping system to the atmosphere when the system is subject to a negative pressure gradient to prevent back siphonage through the system, the breaker including a body defining an interior cavity and having a liquid inlet and a liquid outlet both in communication with said interior cavity; said filter assembly comprising:

a vent cap constructed and arranged to be removably attachable to the body, said vent cap defining at least one vent opening therein providing a passage for air flow between atmosphere and the interior cavity, said vent cap comprising a riser structure extending away from the body with said at least one vent opening being formed in said riser structure and an external cap element attached to said riser structure so as to protectively cover said vent opening without blocking the passage for air flow provided thereby, a float post extending from said vent cap into the interior cavity, said float post being constructed and arranged to slidably accommodate an air cut-off float element of the breaker, the float element being constructed and arranged to slide along said float post between an air cut-off position in which the air cut-off float element blocks said passage for air flow to prevent the piping system from being vented to atmosphere and a venting position in which the air cut-off element is moved away from said passage for air flow to vent the piping system to atmosphere and to assume the air cut-off position when the piping system is pressurized and to assume the venting position when the piping system is subject to a negative pressure gradient; and an air-permeable and water resistant barrier constructed and arranged to be operatively coupled to at least one of the body and said vent cap so as to intersect the air flow to substantially prevent foreign debris from entering the piping system through said at least one vent opening, wherein said external cap element has a cylindrical boss centrally disposed on an underside thereof with said float post extending coaxially from said cylindrical boss, said cylindrical boss having exterior threads formed thereon, and wherein said air-permeable barrier comprises a generally annular structure defining a central axial opening therethrough with one end of said central axial opening having interior threads formed thereat, said annular structure being disposed coaxially with said float post beneath said external cap element in intersecting relation with respect to said passage for air flow and being secured beneath said external vent cap by threadingly engaging said interior threads of said central axial opening with said exterior threads of said cylindrical boss.

* * * * *